United States Patent Office 3,562,271
Patented Feb. 9, 1971

3,562,271
3-CYCLOAMINO-1,2,8,9-TETRAAZAPHENALENES
Karl J. Doebel, Ossining, and John E. Francis, Pleasantville, N.Y., assignors to Geigy Chemical Corporation, Ardsley, N.Y., a corporation of New York
No Drawing. Continuation-in-part of application Ser. No. 718,227, Apr. 2, 1968, which is a continuation-in-part of applications Ser. No. 445,762, Apr. 5, 1965; Ser. No. 539,303, Apr. 1, 1966; and Ser. No. 583,980, Oct. 3, 1966. This application Mar. 24, 1969, Ser. No. 810,006
Int. Cl. C07d 51/04
U.S. Cl. 260—250                    12 Claims

ABSTRACT OF THE DISCLOSURE 3-cycloamino-1,2,8,9-tetraazaphenalenes optionally substituted in the 4, 5, 6, 7 and/or 9 positions and their salts are cardiovascular agents and can be prepared from the corresponding 1,2,8,9-tetraazaphenalenes. A representative embodiment is 3-N-piperidino-1,2,8,9-tetraazaphenalene.

CROSS-REFERENCE

This is a continuation-in-part of copending application Ser. No. 718,227 filed Apr. 2, 1968 which in turn is a continuation-in-part of Ser. Nos. 583,980, 539,303 and 445,762 filed Oct. 3, 1966, Apr. 1, 1966 and Apr. 5, 1965, respectively, all now abandoned, Ser. No. 539,303 being a continuation-in-part of Ser. No. 445,762 and Ser. No. 583,980 being a continuation-in-part of Ser. Nos. 539,303 and 445,762.

DETAILED DESCRIPTION

The present invention pertains to 3-cycloamino-1,2,8,9-tetraazaphenalenes of the formula:

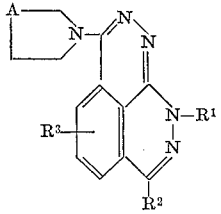

I wherein $R^1$ is hydrogen, (lower)alkyl, phenyl or phenyl(lower)alkyl;
$R^2$ is hydrogen or phenyl;
$R^3$ is hydrogen, chloro, bromo, hydroxy, (lower)alkoxy, carboxy or nitro; and
A is methylene, ethylene, trimethylene, vinylene or o-phenylene and to the acid addition salts thereof.

The term "alkyl" and derivations thereof such as "alkoxy" denotes a straight or branched hydrocarbon chain. When qualified by the designation "(lower)" such chain will contain up to and including 6 carbon atoms. Illustrative of such alkyl groups are methyl, ethyl, propyl, isopropyl, butyl, sec-butyl, t-butyl, pentyl, hexyl and the like, while illustrative of such alkoxy groups are methoxy, ethoxy, propoxy, butoxy and the like.

The compounds of the present invention are identified herein as derivatives of the novel parent tricyclic nucleus 1,2,8,9-tetraazaphenalene which is assigned the following numbering

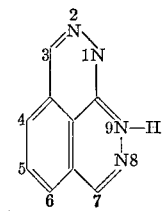

The tetraazaphenalenes of the present invention are characterized in part by the presence of a cycloamino function in the 3-position. Typical of such heterocyclic amino groups are pyrrolidino, piperidino, hexamethyleneimino, tetrahydropyridine and tetrahydroisoquinoline.

The 3-cycloamino-1,2,8,9-tetraazaphenalenes of the instant invention are cardiovascular agents, in particular, blood pressure lowering agents and are used in counteracting hypertension. They also manifest coronary and peripheral vascular dilation properties, effects on the central nervous system and anti-inflammatory activity.

These compounds can be administered parenterally or orally in any of the usual pharmaceutical forms including tablets, capsules, powders, suspensions, solutions, syrups and the like, including sustained release preparations which can be compounded by any of the known procedures.

The 3-cycloamino-1,2,8,9-tetraazaphenalenes of the present invention are prepared through treatment of a 3-chloro- or 3-bromo-1,2,8,9-tetraazaphenalene of Formula II with the appropriate amine.

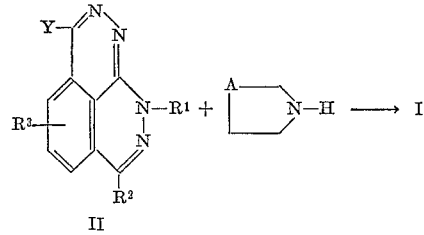

II

In the above Y is chloro or bromo and $R^1$, $R^2$, $R^3$ and A are as previously defined.

The reaction is executed by simply heating a mixture of the reactants optionally in an inert organic solvent such as methylcellosolve, diglyme, triglyme or the like. Generally excess amine is employed, and in the case of lower boiling amines, increased pressure may be utilized.

The valuable 3-chloro and 3-bromo-1,2,8,9-tetraazaphenalenes of Formula II can be prepared by several routes. In one method a 3-keto-2,3-dihydro-1,2,8,9-tetraazaphenalene is treated with an excess phosphorus oxychloride or phosphorus pentachloride and phosphorus oxychloride or phosphorus oxybromide or phosphorus pentabromide and phosphorus oxybromide at elevated temperatures, e.g., at reflux, until a chloro or bromo group is introduced in the 3-position. This transformation may be represented as follows:

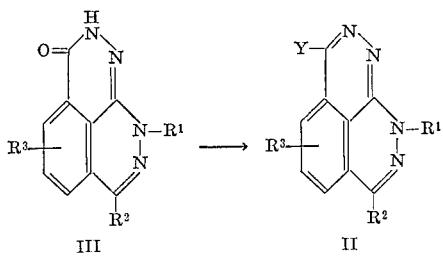

Alternatively, the 3-chloro and 3-bromo-1,2,8,9-tetraazaphenalene compounds of Formula II can be prepared from the corresponding 3-unsubstituted 1,2,8,9-tetraazaphenalenes through the action of chlorine or bromine in the presence of sodium acetate.

The above mentioned 3-keto-2,3-dihydro-1,2,8,9-tetraazaphenalenes and 3-unsubstituted-1,2,8,9-tetraazaphenalenes are the subject of copending applications filed herewith. Briefly, one preparation of such compounds involves the following:

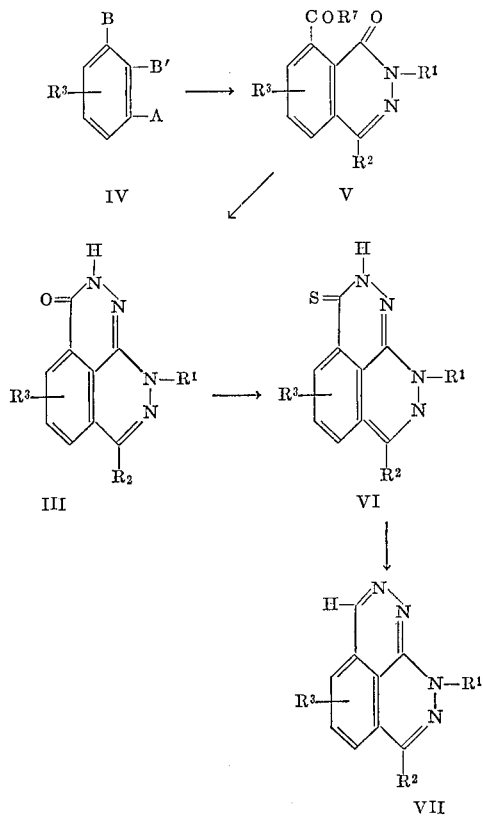

With greater particularity to the above reaction scheme, the starting material is a compound of Formula IV wherein $R^3$ is as previously defined, A is dibromomethyl, an aldehyde group, or benzoyl and each of B and B' is a carboxyl group or a group the oxidative state of which corresponds to that of a carboxyl group, including acid halides, anhydrides, esters and lactones thereof. Representative compounds of Formula IV thus include 3-dibromomethylphthalic anhydride, 3-hydroxy-7-carboxyphthalide, 2-dibromomethyl-6-carbethoxybenzoic acid. A compound of Formula IV is then treated with a single molar equivalent of a hydrazine to yield the substituted 1(2H)phthalazinone of Formula V wherein $R^7$ is hydroxy. This, or the corresponding derivative wherein $R^7$ is alkoxy, chloro or bromo, when treated with hydrazine, yields the 3-keto-2,3-dihydro-1,2,8,9-tetraazaphenalene of Formula III which is converted directly to the 3-chloro- or 3-bromo-1,2,8,9-tetraazaphenalene of Formula II as previously described. Alternatively the keto compound of Formula III is treated with phosphorus pentasulfide in, for example, refluxing pyridine to yield the corresponding 3-thiono-2,3-dihydro-1,2,8,9-tetraazaphenalene of Formula VI. This thiono compound is then treated with Raney nickel in an inert organic solvent such as methyl Cellosolve to yield the corresponding 3-substituted 1,2,8,9-tetraazaphenalenes of Formula VII.

Included within the scope of the present invention are the acid addition salts of these novel tetraazaphenalene derivatives, obtained via the conventional methods. Typical salts thus include those derived from hydrochloric, hydrobromic, sulfuric, phosphoric, methanesulfonic, acetic, lactic, succinic, embonic, malic, maleic, aconitic, phthalic, tartaric and the like acids. Quaternary salts derived from alkyl halides are also within the scope of this invention.

The following examples, presented for illustration and not limitation, will serve to further typify the nature of the present invention. In these examples temperature is expressed in degrees centigrade.

EXAMPLE 1

3-chloro-9-phenyl-1,2,8,9-tetraazaphenalene (a) 3-dibromomethylphthalic anhydride.—A mixture of 3-methylphthalic anhydride (81 g.), N-bromosuccinimide (182 g.), benzoyl peroxide (40 mg.) and carbon tetrachloride (1500 ml.) is irradiated and heated to reflux by a 100-watt insertion-type ultraviolet lamp under stirring and exclusion of moisture. After the mixture becomes brick red, an additional 40 mg. of benzoyl peroxide is added. Illumination at reflux is carried out during 24 hours. The mixture is cooled and filtered free of succinimide and the filtrate is evaporated in vacuo. The residual yellowish brown solid is dissolved in hot ether, treated with decolorizing charcoal and filtered. Addition of hexane to the filtrate affords the crystalline product, M.P. 90.5–93° C. in 72% yield. Two recrystallizations from ether-hexane yield colorless needles melting at 93–95° C.

Calc'd for $C_9H_4Br_2O_3$ (percent): C, 33.78; H, 1.26; Br, 49.92. Found (percent): C, 33.66; H, 1.20; Br, 49.41.

(b) 3-hydroxy-7-carboxyphthalide.—3-dibromomethylphthalic anhydride (40 g.) is added in small portions to a hot solution of 2 N sodium hydroxide (500 ml.) with stirring. After ten minutes, the clear solution is rendered strongly acidic with concentrated hydrochloric acid and heated for one-half hour at 80°. The solution is evaporated to dryness in vacuo and the residue is dissolved in hot water (600 ml.), treated with decolorizing charcoal and filtered.

After three days at 5° C., the colorless filtrate yields 21.3 g. (88%) of colorless blocks, M.P. 163.5–166° C. The analytical sample, M.P. 165.5–168.5° C., is obtained after two further crystallizations from water.

Calc'd for $C_9H_6O_5$ (percent): C, 55.68; H, 3.12. Found (percent): C, 55.98; H, 2.99.

(c) 8-carboxy-2-phenyl-1(2H)-phthalazinone.—A mixture of phenylhydrazine (3.6 ml.), 3-hydroxy-7-carboxyphthalide (5.82 g.) and glacial acetic acid (100 ml.) is heated under reflux for 18 hours. The clear solution is evaporated to dryness in vacuo and the residual solid triturated with methanol and collected. The product (6.97 g.), M.P. 197–199°, is recrystallized from benzene and a colorless crystalline product, M.P. 197–198° obtained.

Calc'd for $C_{15}H_{10}N_2O_3$ (percent): C, 67.66; H, 3.79; N, 10.52. Found (percent): C, 67.28; H, 3.75; N, 10.82.

The infrared spectrum (Nujol) shows prominent peaks at 1720 cm.$^{-1}$ (carboxyl group) and 1650 cm.$^{-1}$ (amide carbonyl).

(d) 8-carbethoxy-2-phenyl-1(2H)phthalazinone.—To a solution of thionyl chloride (40 ml.) in chlorobenzene (150 ml.) is added under stirring 8-carboxy-2-phenyl-1(2H)phthalazinone (24.3 g.) and the mixture heated at reflux with exclusion of moisture for 2 hours. When the evolution of gas has ceased, the solution is evaporated to dryness in vacuo. The residual white solid (24.7 g.) is treated with absolute ethanol (350 ml.) and heated under reflux for 18 hours. The solution is filtered hot and allowed to cool slowly. The ester precipitates in colorless needles, M.P. 150–151°. The melting point is unchanged after recrystallization from ethanol.

Calc'd for $C_{17}H_{14}N_2O_3$ (percent): C, 69.37; H, 4.79; N, 9.52. Found (percent): C, 69.08; H, 4.65; N, 9.36.

(e) 3-keto-9-phenyl-2,3-dihydro-1,2,8,9-tetraazaphenalene.—A mixture of 2-phenyl-8-carbethoxy-1(2H)phthalazinone (11.76 g.), 100% hydrazine hydrate (40 ml.) and methyl Cellosolve (160 ml.) is heated at reflux for 25 hours. The yellow solution is filtered and treated with methanol (100 ml.) followed by water dropwise under stirring. A flocculent yellow precipitate forms. The mixture is cooled and the product collected, washed thoroughly with water and ethanol and dried in vacuo. The solid (4.44 g.) M.P. 254–6°, is recrystallized from methyl cellosolve and obtained as yellow needles, M.P. 255–7°.

Calc'd for $C_{15}H_{10}N_4O$ (percent): C, 68.70; H, 3.85; N, 21.37. Found (percent): C, 68.81; H, 3.90; N, 21.20.

(f) 3-chloro-9-phenyl-1,2,8,9-tetraazaphenalene.—To a stirred mixture of phosphorus pentachloride (6.3 g.) in phosphorus oxychloride (40 ml.) is added finely powdered 3 - keto - 9-phenyl-2,3-dihydro-1,2,8,9-tetraazaphenalene (7.8 g.). The mixture is stirred at reflux for 165 minutes under moisture exclusion and then poured cautiously into ice. The mixture is made alkaline under cooling with 20% sodium hydroxide solution and the fine yellow precipitate which forms is collected and washed with water. As this material still contains inorganic solid, it is stirred for ½ hour in 600 ml. of water (50°) water and again filtered. The precipitate is recrystallized from ethanol and 5.4 g. of yellow crystals, M.P. 225–228°, obtained.

EXAMPLE 2

3-chloro-9-methyl-1,2,8,9-tetraazaphenalene (a) 3 - keto-2,3-dihydro-1,2,8,9-tetraazaphenalene.—A suspension of α,α - dibromo-3-methylphthalic anhydride (80 g.) in ethanol (500 cc.) is treated with a solution of 100% hydrazine hydrate (100 cc.) and water (100 cc.) dropwise under stirring and cooling. A white suspension forms. After the addition, the temperature is raised gradually to reflux, whereupon the white suspension disappears and a yellow precipitate forms. After 88 hours at reflux, the mixture is cooled, filtered and the first crop of product is washed with water and ethanol and dried in vacuo, dissolved in 500 ml. of glacial acetic acid and heated under reflux for 18 hours. The mixture is cooled and filtered and a second crop of the product obtained. The overall yield of product, M.P. >347°, is 25.7 g., or 55% of theory. The product is recrystallized from 3 liters of boiling dimethylformamide and obtained as a yellow powder which, on heating, forms a microcrystalline solid at 220–270° C. and melts above 350° C.

Calc'd. (percent): C, 58.06; H, 3.25; N, 30.09. Found (percent): C, 5792, 58.03; H, 3.58, 3.52; N, 30.28.

(b) 3-keto-9-methyl-2,3-dihydro-1,2,8,9-tetraazaphenalene.—To a stirred suspension of sodium methoxide (0.7 g.) in dry methylsulfoxide (100 ml.) is added 3-keto-2,3-dihydro-1,2,8,9-tetraazaphenalene (1.86 g.). This is stirred at 60° under moisture exclusion until a red solution has formed. This is cooled to 50° C. and methyliodide (1 ml.) is added. The solution darkens, and after 20 minutes, more methyliodide (1 ml.) is added and the solution is poured into ice water (500 ml.) containing 0.5 g. of sodium bisulfite and 4 ml. of glacial acetic acid. The mixture is cooled overnight and then filtered. The product is collected by filtration, washed with water and dried. The yellow solid (1.2 g.) is twice recrystallized from methyl Cellosolve and clarified with charcoal, to yield the product, M.P. 289–293°.

(c) 3-chloro-9-methyl-1,2,8,9-tetraazaphenalene.—To a stirred mixture of phosphorus pentachloride (11.25 g.) in phosphorus oxychloride (90 ml.) is added 3-keto-9-methyl-2,3-dihydro-1,2,8,9-tetraazaphenalene. This mixture is stirred at reflux under moisture exclusion for 2 hours and then poured into ice and rendered basic under stirring and cooling with 20% sodium hydroxide solution. The yellow solid is collected, washed thoroughly with water and dried in a dessicator over phosphorous pentoxide. The product (8.63 g.) is recrystallized twice from ethanol with clarification over charcoal to yield 4.75 g. of product, M.P. 253–255° (dec.).

In a similar fashion to that described in part (c) of this example, 3-keto-2,3-dihydro-1,2,8,9-tetraazaphenalene is converted to 3-chloro-1,2,8,9-tetraazaphenalene which as the methanesulfonate salt melts at 246–249° (dec.).

EXAMPLE 3

3-chloro-7-phenyl-1,2,8,9-tetraazaphenalene (a) 8-carboxy-4-phenyl-1(2H)phthalazinone.—A mixture of 32.5 g. of 3-benzoylphthalic acid and 85 ml. of hydrazine hydrate in 145 ml. of water is heated at reflux for 18 hours. Upon cooling and acidification with hydrochloric acid, the product forms as a solid. This is collected and recrystallized from glacial acetic acid, M.P. 257–259°.

(b) 8-carbomethoxy-4-phenyl - 1(2H)phthalazinone.—The product of part (a) (19.0 g.), 32 ml. of thionyl chloride and 115 ml. of chlorobenzene is heated at reflux with stirring and exclusion of moisture for 3 hours. The solid obtained upon concentration under reduced pressure is taken up in 300 ml. of methanol and this solution is then heated at reflux for 18 hours. Upon cooling the product, M.P. 198–202°, is collected and can be used directly in the next step.

(c) 3-keto-7-phenyl-2,3-dihydro-1,2,8,9-tetraazaphenalene.—A mixture of 18.6 g. of 8-carbomethoxy-4-phenyl-1(2H)phthalazinone, 400 ml. of hydrazine hydrate and 100 ml. of water is heated at reflux for 20 hours. The solid which forms upon cooling is collected, washed with water and recrystallized from methyl Cellosolve, M.P. over 350° C.

(d) 3-chloro-7-phenyl - 1,2,8,9 - tetraazaphenalene.—A mixture of 3-keto-7-phenyl-2,3-dihydro-1,2,8,9-tetraazaphenalene (5 g.), phosphoryl chloride (27 ml.) and phosphorus pentachloride (4 g.) is heated at reflux under moisture exclusion. The mixture is then concentrated under reduced pressure, taken up in acetone and quenched in ice-water. The solid product is collected, washed with cold water and dried, M.P. 278–288° C.

EXAMPLE 4

3-chloro-9-benzyl-1,2,8,9-tetraazaphenalene

A mixture of 3-keto-9-benzyl-2,3-dihydro-1,2,8,9-tetraazaphenalene (47 g.), phosphorus oxychloride (340 ml.) and phosphorus pentachloride (43 g.) is heated at reflux with exclusion of moisture for 1½ hours. The reaction mixture is then evaporated to dryness at reduced pressure and the residue taken up in acetone. This acetone solution is poured into ice water with stirring and the resultant mixture is rendered basic with 20% sodium hydroxide solution and extracted with chloroform. The chloroform extracts are washed with water, dried over sodium sulfate and concentrated to dryness at reduced pressure to yield the product which is purified through recrystallization from a mixture of methyl Cellosolve and ethanol, M.P. 203.5–207.5°.

Further purification may be effected through passage of a chloroform solution of the product over neutral alumina follower by recrystallization from benzene, M.P. 208–209°.

EXAMPLE 5

3-bromo-9-methyl-1,2,8,9-tetraazaphenalene (a) 9 - methyl - 1,2,8,9-tetraazaphenalene.—3-keto-9-methyl-2,3-dihydro-1,2,8,9-tetraazaphenalene (9.0 g.) in 120 ml. of dry pyridine and 12 g. phosphorus pentasulfide are mixed with stirring and refluxed for 2.5 hours. The mixture is poured into an ice-salt mixture, stirred for 30 minutes and filtered. The solid thus collected is dried and recrystallized from methyl Cellosolve to yield 3-thiono-9-methyl-2,3-dihydro-1,2,8,9 - tetraazaphenalene, M.P. 299–316° C.

3-thiono-9-methyl-2,3-dihydro-1,2,8,9-tetraazaphenalene (1.08 g.) is suspended in ethanol (200 ml.) and treated with Raney nickel (about 5 g.) in ethanol added in several portions. After the addition is complete, the mixture is stirred for one hour on the steam bath and then filtered hot. The filtrate is evaporated in vacuo, taken up in ethanol and again filtered. Evaporation of the ethanol solution yields a yellow solid (0.60 g.). The product is purified by one recrystallization from benzenehexane. Yellow crystals (0.40 g.) are obtained melting in the range 145–147°.

Calc'd. for $C_{10}H_8N_4$ (percent): C, 65.20; H, 4.38; N, 30.42. Found (percent): C, 65.03; H, 4.59; N, 30.15.

(b) 3 - bromo-9-methyl-1,2,8,9-tetraazaphenalene.—To a solution of 9-methyl-1,2,8,9-tetraazaphenalene (368 mg.) and 165 mg. of anhydrous sodium acetate in 25 ml. of glacial acetic acid are added in a dropwise fashion with stirring 320 mg. of bromine in 25 ml. of glacial acetic acid. The mixture is stirred for 18 hours and then poured into water, filtered and concentrated to dryness. The solid is triturated with warm water, filtered and recrystallized from ethanol to yield the product, M.P. 237–238°.

Calc'd for $C_{10}H_7N_4Br$ (percent): C, 45.65; H, 2.68; N, 21.29. Found (percent): C, 45.30; H, 2.57; N, 21.54.

EXAMPLE 6

3-N-piperidino-9-phenyl-1,2,8,9-tetraazaphenalene

A mixture of 3-chloro-9-phenyl-1,2,8,9-tetraazaphenalene (8.0 g.) and freshly distilled piperidine (100 ml.) is heated at reflux under moisture exclusion for 48 hours. The mixture is cooled to room temperature and the precipitate collected (3.87 g.). The mother liquor is evaporated in vacuo and, on trituration with benzene, yields 4.34 g. of yellow crystals. The benzene mother liquor is evaporated in vacuo and, on trituration with hexane, yields the same material (3.58 g.). The original solid, containing mostly piperidine hydrochloride is triturated with water and filtered. The recovered solid (0.85 g.) is combined with two other crops and recrystallized from benzene-hexane, from which 6.22 g. of pure product, M.P. 178–179° are obtained.

EXAMPLE 7

3-N-piperidino-1,2,8,9-tetraazaphenalene

To a solution of piperidine (20 cc.) and methyl Cellosolve (100 cc.) is added 3-chloro-1,2,8,9-tetraazaphenalene hydrochloride (12.05 g.). This mixture is heated 24 hours under reflux, evaporated to incipient dryness, treated with water (150 cc.) and filtered. The solid is taken up in hot chloroform and this solution is filtered. The resulting solid (4.4 g.) is set aside. The filtrate is evaporated in vacuo to dryness and the residue recrystallized from ethanol. The product (3.9 g., M.P. 252–254°) is purified by two additional recrystallizations from ethanol followed by a recrystallization from chloroform. This material, M.P. 255–256.5°, shows a single spot, rf=0.5 in the system 40 dioxane: 50 benzene: 5 abs. ethanol: 5 ammonium hydroxide.

EXAMPLE 8

3-N-pyrrolidino-9-phenyl-1,2,8,9-tetraazaphenalene

A mixture of 3-chloro-9-phenyl-1,2,8,9-tetraazaphenalene (1.0 g.), pyrrolidine (1 ml.) and methyl Cellosolve (20 ml.) is stirred at reflux under nitrogen for 24 hours. The mixture is concentrated to dryness and the residue taken up with chloroform, washed with water and extracted with 3 N hydrochloric acid. The acidic solution is rendered basic with sodium carbonate whereupon an orange precipitate forms. The precipitate is collected by filtration, washed with water and dried. The product is twice recrystallized from carbon tetrachloride-ether and obtained in reddish-orange crystals, M.P. 177–179°.

EXAMPLE 9

3-N-pyrrolidino-1,2,8,9-tetraazaphenalene

A mixture of 3-chloro-1,2,8,9-tetraazaphenalene (24.1 g.), methyl Cellosolve (200 ml.) and pyrrolidine (40 ml.) is heated at reflux for 24 hours. The mixture is filtered hot and the filtrate evaporated to dryness at reduced pressure. The residue is triturated with water and the product collected, dried and recrystallized from ethanol, M.P. 253–255°.

Calc'd for $C_{13}H_{13}N_5$ (percent): C, 62.25; H, 5.48; N, 29.27. Found (percent): C, 65.13; H, 5.53; N, 29.08.

EXAMPLE 10

3-(N-piperidino)-9-methyl-1,2,8,9-tetraazaphenalene

By substituting 3 - chloro - 9 - methyl - 1,2,8,9 - tetraazaphenalene for 3-chloro-1,2,8,9-tetraazaphenalene in the procedure of Example 7, this product is obtained, M.P. 171–174°.

EXAMPLE 11

3-(1,2,5,6-tetrahydropyridyl)-1,2,8,9-tetraazaphenalene

A mixture of 24.1 g. of 3-chloro-1,2,8,9-tetraazaphenalene, 30 ml. of 1,2,3,6-tetrahydropyridine and 200 ml. of methyl Cellosolve is heated at reflux for 24 hours and then evaporated to dryness. The residue is dissolved in hot chloroform and this solution is filtered and evaporated. Trituration of the residue yields 3-(1,2,5,6-tetrahydropyridyl)-1,2,8,9-tetraazaphenalene. This material is suspended in absolute methanol (400 ml.) and treated with 10 ml. methanesulfonic acid, heating until a solution is obtained. This solution is cooled in an ic ebath and the solid which forms is collected by filtration, washed with methanol and dried to yield the product as the methanesulfonate salt, M.P. 255–256.5°.

EXAMPLE 12

3-hexamethyleneimino-9-methyl-1,2,8,9-tetraazaphenalene

A mixture of 3-chloro-9-methyl-1,2,8,9-tetraazaphenalene (10.95 g.) and hexamethyleneimine (100 ml.) is stirred at reflux for 20 hours. The mixture is cooled and the solid removed by filtration. The filtrate is diluted with 200 ml. of water and extracted with chloroform. The chloroform extracts are dried and evaporated in vacuo. The residue is triturated with hexane and the solid is collected and recrystallized from hexane. This material is chromatographed on Woelm neutral alumina, Grade 1 (200 g.) with chloroform as eluent to yield the product which is recrystallized twice from hexane containing a little benzene, M.P. 131–133°.

EXAMPLE 13

3-N-(1,2,3,4-tetrahydroisoquinolyl)-9-phenyl-1,2,8,9-tetraazaphenalene

A mixture of 3-chloro-9-phenyl-1,2,8,9-tetraazaphenalene (10 g.), 1,2,3,4-tetrahydroisoquinoline (5 ml.) and methyl Cellosolve (200 ml.) is stirred at reflux for 40 hours, then evaporated to dryness at reduced pressure. The residue is triturated with water and the solid collected. This material is chromatographed on alumina with chloroform as solvent. Eluted fractions are checked by thin layer chromatography against starting material. Those fractions containing the new compound are combined, evaporated to dryness and the product purified by recrystallization from chloroform-ether, M.P. 220–222°.

Calc'd. for $C_{24}H_{19}N_5$ (percent): C, 76.37; H, 5.08; N, 18.56. Found (percent): C, 76.09; H, 5.00; N, 18.58.

EXAMPLE 14

3-N-(1,2,3,4-tetrahydroisoquinolyl)-1,2,8,9-tetraazaphenalene

A mixture of 1,2,3-4-tetrahydroisoquinoline (18 ml.), methyl Cellosolve (100 ml.) and 3-chloro-1,2,8,9-tetraazaphenalene (12.05 g.) is stirred at reflux for 44 hours. The mixture is filtered and the filtrate concentrated to dryness at reduced pressure. The product is purified by recrystallization from ethanol, M.P. 224–228°.

Calc'd. for $C_{18}H_{15}N_5$ (percent): C, 71.74; H, 5.02; N, 23.24. Found (percent): C, 71.55; H, 4.94; N, 23.54.

EXAMPLE 15

3-N-(1,2,3,4-tetrahydroisoquinolyl)-9-methyl-1,2,8,9-tetraazaphenalene

A mixture of 3-chloro-9-methyl-1,2,8,9-tetraazaphenalene (10 g.), 1,2,3,4-tetrahydroisoquinoline (10 ml.) and methyl Cellosolve (100 ml.) is heated at reflux for 48 hours. The mixture is poured into ether and the yellow solid collected by filtration, washed with water and dried, M.P. 231–233°.

What is claimed is:
1. a compound of the formula:

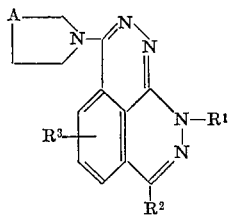

wherein
$R^1$ is hydrogen, (lower)alkyl, phenyl or phenyl(lower)alkyl;
$R^2$ is hydrogen or phenyl;
$R^3$ is hydrogen, chloro, bromo, hydroxy, (lower)alkoxy, carboxy or nitro; and
A is methylene, ethylene, trimethylene, vinylene or o-phenylene.

2. The acid addition salts of a compound according to claim 1.
3. The compound according to claim 1 wherein said compound is 3-piperidino-9-phenyl-1,2,8,9-tetraazaphenalene.
4. The compound according to claim 1 wherein said compound is 3-piperidino-1,2,8,9-tetraazaphenalene.
5. The compound according to claim 1 wherein said compound is 3-pyrrolidino-9-phenyl-1,2,8,9-tetraazaphenalene.
6. The compound according to claim 1 wherein said compound is 3-pyrrolidino-1,2,8,9-tetraazaphenalene.
7. The compound according to claim 1 wherein said compound is 3-(N-piperidino)-9-methyl-1,2,8,9-tetraazaphenalene.
8. The compound according to claim 1 wherein said compound is 3-(1,2,5,6-tetrahydropyridyl)-1,2,8,9-tetraazaphenalene.
9. The compound according to claim 1 wherein said compound is 3-hexamethyleneimino-9-methyl-1,2,8,9-tetraazaphenalene.
10. The compound according to claim 1 wherein said compound is 3-N-(1,2,3,4-tetrahydroisoquinolyl)-9-phenyl-1,2,8,9-tetraazaphenalene.
11. The compound according to claim 1 wherein said compound is 3-N-(1,2,3,4-tetrahydroisoquinolyl)-1,2,8,9-tetraazaphenalene.
12. The compound according to claim 1 wherein said compound is 3-N-(1,2,3,4-tetrahydroisoquinolyl)-9-methyl-1,2,8,9-tetraazaphenalene.

References Cited
UNITED STATES PATENTS

| | | | |
|---|---|---|---|
| 3,422,105 | 1/1969 | Doebel et al. | 260—250 |
| 3,429,882 | 2/1969 | Doebel et al. | 260—250 |

NICHOLAS S. RIZZO, Primary Examiner

U.S. Cl. X.R.
424—250